US010383288B2

(12) United States Patent
Wills (10) Patent No.: US 10,383,288 B2
(45) Date of Patent: Aug. 20, 2019

(54) HEIGHT-ADJUSTABLE PLANT SUPPORT STRUCTURE

(71) Applicant: Jackie Wills, Aurora, IL (US)

(72) Inventor: Jackie Wills, Aurora, IL (US)

(*) Notice: Subject to any disclaimer, the term of this patent is extended or adjusted under 35 U.S.C. 154(b) by 0 days.

(21) Appl. No.: 15/280,862

(22) Filed: Sep. 29, 2016

(65) Prior Publication Data

US 2018/0084737 A1 Mar. 29, 2018

(51) Int. Cl.
*A01G 9/00* (2018.01)
*A01G 9/12* (2006.01)
*A01G 29/00* (2006.01)

(52) U.S. Cl.
CPC .............. *A01G 9/124* (2013.01); *A01G 9/122* (2013.01); *A01G 29/00* (2013.01)

(58) Field of Classification Search
CPC ........ A01G 9/124; A01G 9/022; A01G 9/128; A01G 9/12; A01G 27/00; A01G 27/003
USPC ............................................................ 47/62
See application file for complete search history.

(56) References Cited

U.S. PATENT DOCUMENTS

| | | | | |
|---|---|---|---|---|
| 3,066,447 A * | 12/1962 | Reiterer | ................ | A01G 9/124 47/47 |
| 3,165,863 A * | 1/1965 | Duran | ................... | A01G 9/124 248/528 |
| 4,096,662 A * | 6/1978 | Anderson | ................ | A01G 9/00 248/170 |
| 5,502,922 A * | 4/1996 | Shlomo | .................. | A01G 9/023 47/39 |
| 7,905,053 B2 * | 3/2011 | Lisciotti | ................ | A01G 17/14 47/47 |
| 2007/0084108 A1 * | 4/2007 | Hertlein | ................ | A01G 9/122 47/47 |
| 2008/0092440 A1 * | 4/2008 | Johnson | ............. | A01G 13/0212 47/48.5 |
| 2009/0077878 A1 * | 3/2009 | Simpson | ................ | A01G 9/124 47/46 |
| 2009/0320359 A1 * | 12/2009 | Hertlein | ................ | A01G 9/122 47/47 |

* cited by examiner

*Primary Examiner* — Monica L Williams
*Assistant Examiner* — Aaron M Rodziwicz (57) ABSTRACT

A height-adjustable plant support structure is a device used for providing structural support for a growing plant. The device includes a primary stabilizing tubular member and a plurality of primary extendable tubular members that is able to telescopically extend from and retract into the primary stabilizing tubular member. A plurality of accessory-mounting holes laterally traverses into the plurality of primary extendable tubular members and may accommodate hooks, ties, strings, and other accessories for supporting the growth of a plant. A flexible water-distribution conduit is positioned within the plurality of primary extendable tubular members, allowing water to be delivered directly to a plant's roots. The device height may be adjusted manually or automatically via a pneumatic telescopic cylinder. At least one flexible trellis member is utilized to support growing plants such as shrubs, grapevine, ivy, and climbing roses.

10 Claims, 12 Drawing Sheets

SECTION B-B

HEIGHT-ADJUSTABLE PLANT SUPPORT STRUCTURE

FIELD OF THE INVENTION

The present invention relates generally to a device for supporting a plant during growth. More specifically, the present invention is a height-adjustable plant support structure that the user may adjust in order to physically support a plant during growth.

BACKGROUND OF THE INVENTION

Providing structural support to a growing plant is essential for ensuring that the plant does not fall over and that the plant is able to grow in the correct direction. This is typically achieved by securing the plant to a rigid object such as a stake or pole with a tie or hook. While this method is common, it can be quite inconvenient as the plant outgrows the supporting capacity provided by the stake or pole. As a result, a taller stake or pole is required to support the growing plant. A trellis and a plant cage provide structural support to a plant similar to a stake or pole. However, a trellis and a plant cage are generally unable to accommodate a plant that has outgrown the supporting capacity provided by the trellis or plant cage. The present invention seeks to address the aforementioned issues as well as provide a more convenient and practical solution for supporting plants during growth.

The present invention is a height-adjustable plant support structure that the user may adjust as a plant grows. This allows the present invention to be utilized in both earlier and later stages of a plant's growth. As a result, the present invention does not require replacing due to inadequate structural support capacity as a plant grows. A plant may be tied or otherwise secured to the present invention, preventing the plant from falling over, ensuring the plant grows in the correct direction, and otherwise providing structural support to the plant. The present invention additionally allows the user to provide water directly to a plant's roots. The height of the present invention may be adjusted manually or automatically.

DETAIL DESCRIPTIONS OF THE INVENTION

All illustrations of the drawings are for the purpose of describing selected versions of the present invention and are not intended to limit the scope of the present invention.

The present invention is a height-adjustable plant support structure for providing structural support to a plant during growth. The present invention is shown in FIGS. 1-4 and comprises a primary stabilizing tubular member 1, a plurality of primary extendable tubular members 2, a plurality of accessory-mounting holes 9, and a flexible water-distribution conduit 10.

The primary stabilizing tubular member 1 and the plurality of primary extendable tubular members 2 form a tower-like structure that may be extended to accommodate a growing plant. The tower-like structure is thus able to provide structural support to a growing plant. The plurality of primary extendable tubular members 2 is telescopically engaged into the primary stabilizing tubular member 1, allowing the primary stabilizing tubular member 1 to serve as a base for the structure formed by the primary stabilizing tubular member 1 and the plurality of primary extendable tubular members 2. The plurality of primary extendable tubular members 2 is able to extend upward from the primary stabilizing tubular member 1. The plurality of primary extendable tubular members 2 comprises a selected primary tubular member 3, a preceding primary tubular member 4, and a subsequent primary tubular member 5 that form a telescopic arrangement. The selected primary tubular member 3 is telescopically engaged with the subsequent primary tubular member 5, allowing the subsequent primary tubular member 5 to slide within the selected primary tubular member 3. The preceding primary tubular member 4 is telescopically engaged with the selected primary tubular member 3, enabling the selected primary tubular member 3 to slide within the preceding primary tubular member 4.

The plurality of accessory-mounting holes 9 is utilized to secure various accessories such as hooks, ties, or strings to the present invention. Each of the plurality of accessory-mounting holes 9 laterally traverses into a corresponding member from the plurality of primary extendable tubular members 2. As a result, various accessories may be attached to each of the plurality of primary extendable tubular members 2. These accessories may be utilized to tie a plant to the plurality of primary extendable tubular members 2.

Figure 4:
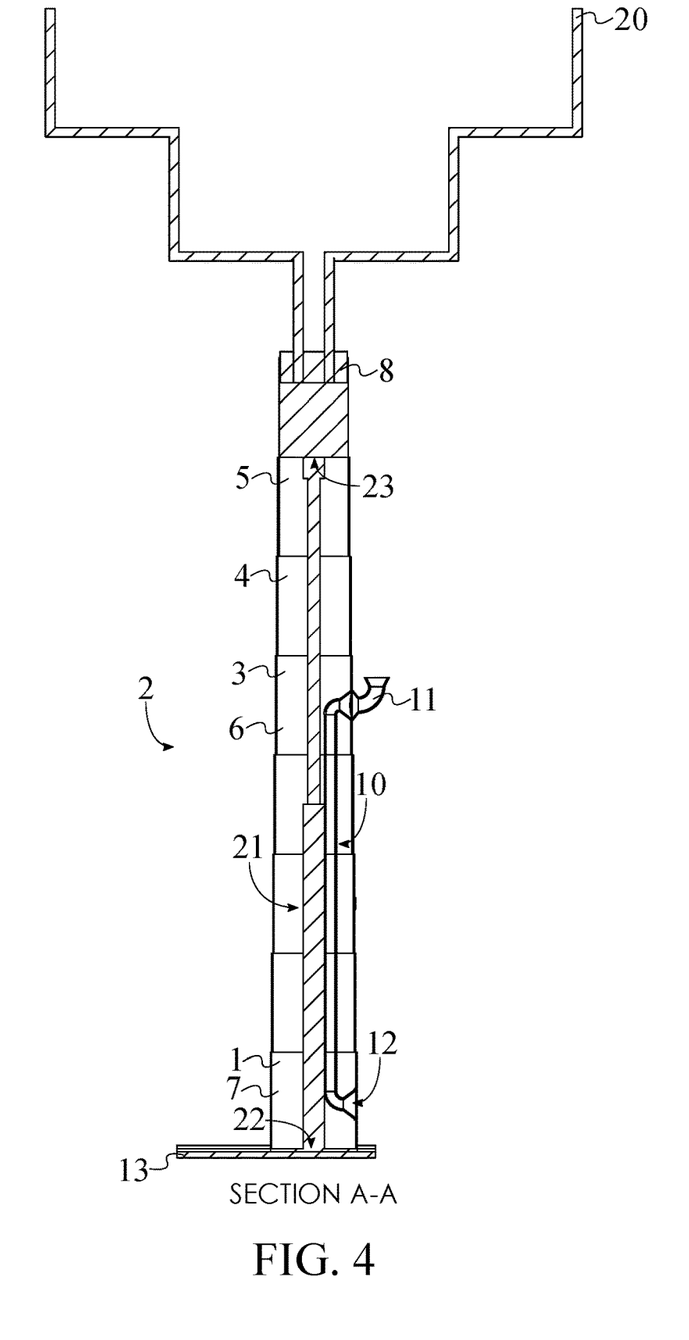
FIG. 4 is a cross-sectional view of the present invention taken along line A-A of FIG. 3.

The flexible water-distribution conduit 10 is utilized to transport water through the interior of the present invention directly to a plant's roots. The flexible water-distribution conduit 10 may be expanded or collapsed as needed as the plurality of primary extendable tubular members 2 is extended or retracted. The flexible water-distribution conduit 10 is internally connected to the plurality of primary extendable tubular members 2. This allows water to be transported through the interior of the plurality of primary extendable tubular members 2 directly to a plant's roots.

The present invention further comprises a base platform 13 and an adjustment track 14. The base platform 13 serves as a foundation for the present invention and enables the present invention to be placed onto a surface such as the interior of a flowerpot. The adjustment track 14 enables the position of the primary stabilizing tubular member 1 and the plurality of primary extendable tubular members 2 to be adjusted. The adjustment track 14 traverses across the base platform 13 and allows the position of the primary stabilizing tubular member 1 and the plurality of primary extendable tubular members 2 to be adjusted as needed on the base platform 13. The primary stabilizing tubular member 1 is oriented normal to the base platform 13, orienting the primary stabilizing tubular member 1 and the plurality of primary extendable tubular members 2 vertically on the base platform 13. The primary stabilizing tubular member 1 is slidably engaged into the adjustment track 14 to allow positional adjustment along the adjustment track 14.

An inlet 11 of the flexible water-distribution conduit 10 is laterally and internally connected to an inlet member 6 from the plurality of primary extendable tubular members 2. The inlet 11 thus forms an opening on the inlet member 6 through which water may be poured from the exterior of the present invention. The position of the inlet member 6 may vary on the plurality of primary extendable tubular members 2. The inlet 11 laterally traverses through the inlet member 6, forming an opening for accessing the flexible water-distribution conduit 10. An outlet 12 of the flexible water-distribution conduit 10 is laterally and internally connected to an outlet member 7. The outlet 12 thus forms an opening on the outlet member 7 through which water is able to exit from the flexible water-distribution conduit 10. The outlet 12 laterally traverses through the outlet member 7, forming an opening through which water from the flexible water-distribution conduit 10 is able to exit.

Figure 5:
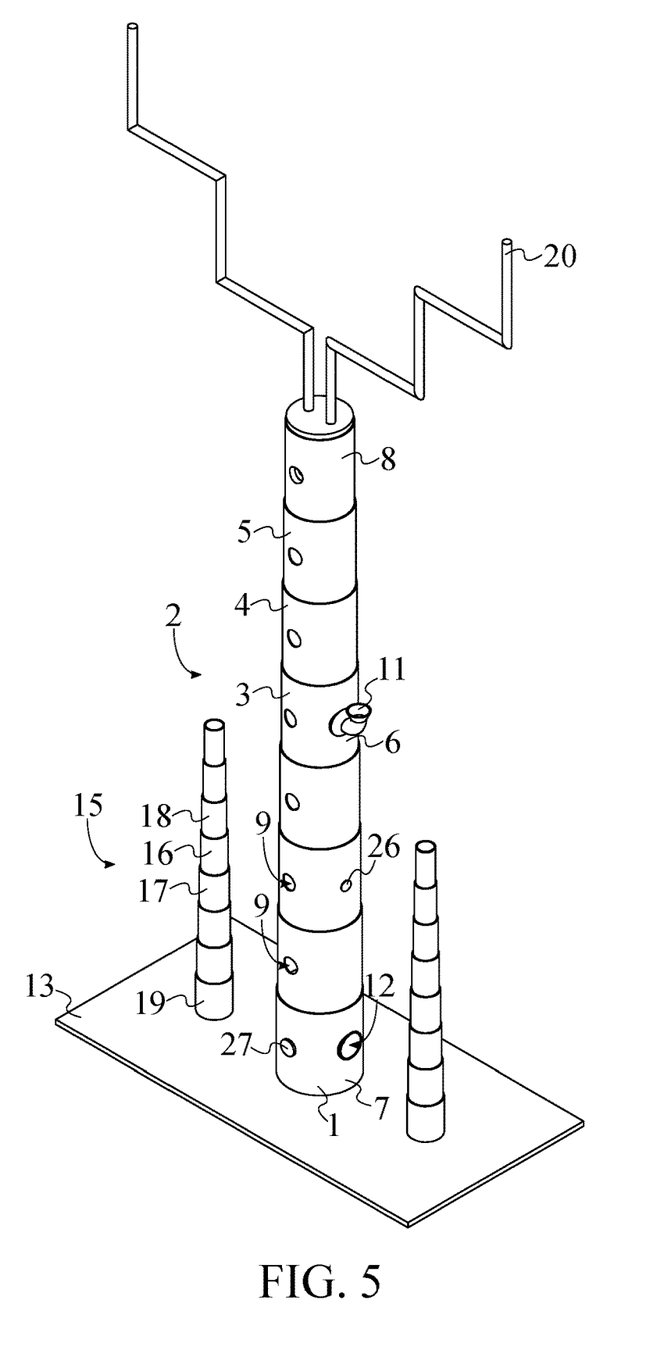
FIG. 5 is a perspective view of an alternative embodiment of the present invention with a secondary stabilizing tubular member and a plurality of secondary extendable tubular members.

The embodiment of the present invention shown in FIG. 5 further comprises a plurality of secondary extendable tubular members 15 and a secondary stabilizing tubular member 19. Similar to the plurality of primary extendable tubular members 2, the plurality of secondary extendable tubular members 15 comprises a selected secondary tubular member 16, a preceding secondary tubular member 17, and a subsequent secondary tubular member 18 that form a telescopic arrangement. The secondary stabilizing tubular member 19 serves as the base of the secondary tower-like structure formed by the secondary stabilizing tubular member 19 and the plurality of secondary extendable tubular members 15. The secondary stabilizing tubular member 19 is mounted onto the base platform 13, adjacent to the primary stabilizing tubular member 1. The secondary stabilizing tubular member 19 and the plurality of secondary extendable tubular members 15 are thus able to accommodate additional smaller plants. The plurality of secondary extendable tubular members 15 is telescopically engaged into the secondary stabilizing tubular member 19, adjacent to the plurality of primary extendable tubular members 2. The plurality of secondary extendable tubular members 15 may thus be extended upward from the secondary stabilizing tubular member 19. The selected secondary tubular member 16 is telescopically engaged with the subsequent secondary tubular member 18, allowing the subsequent secondary tubular member 18 to slide within the selected secondary tubular member 16. The preceding secondary tubular member 17 is telescopically engaged with the selected secondary tubular member 16, allowing the selected secondary tubular member 16 to slide within the preceding secondary tubular member 17.

Figure 1:
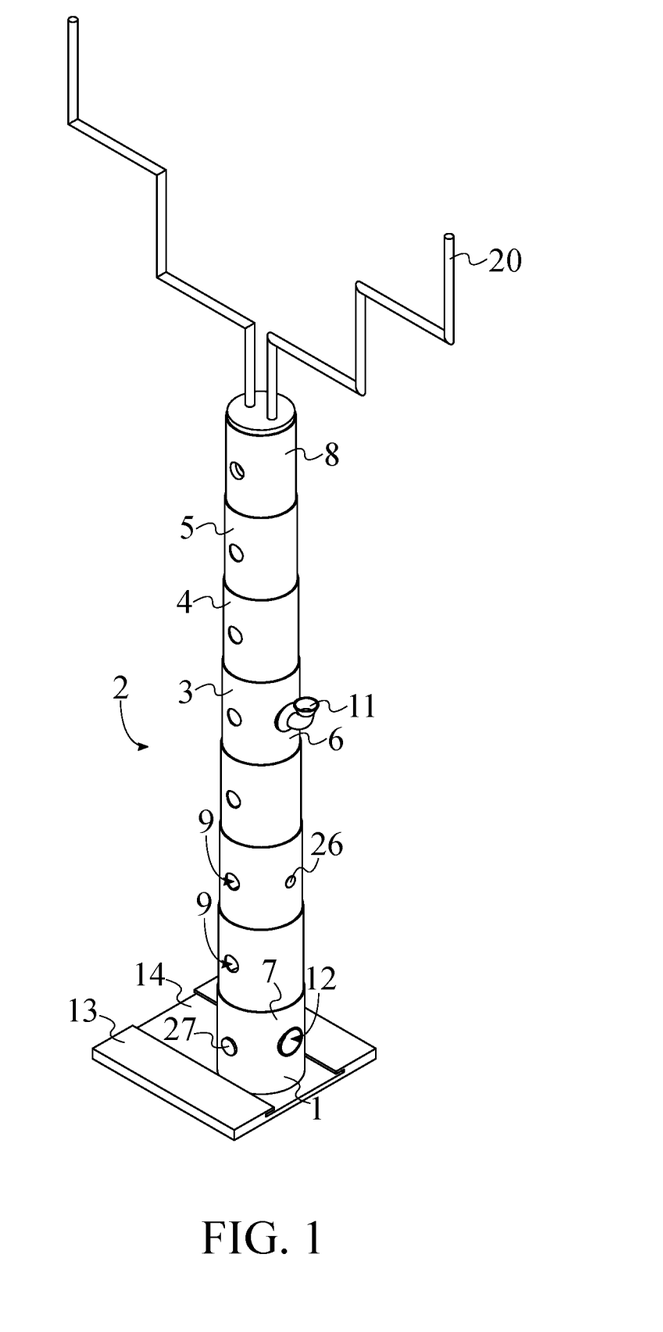
FIG. 1 is a perspective view of the present invention.
Figure 2:
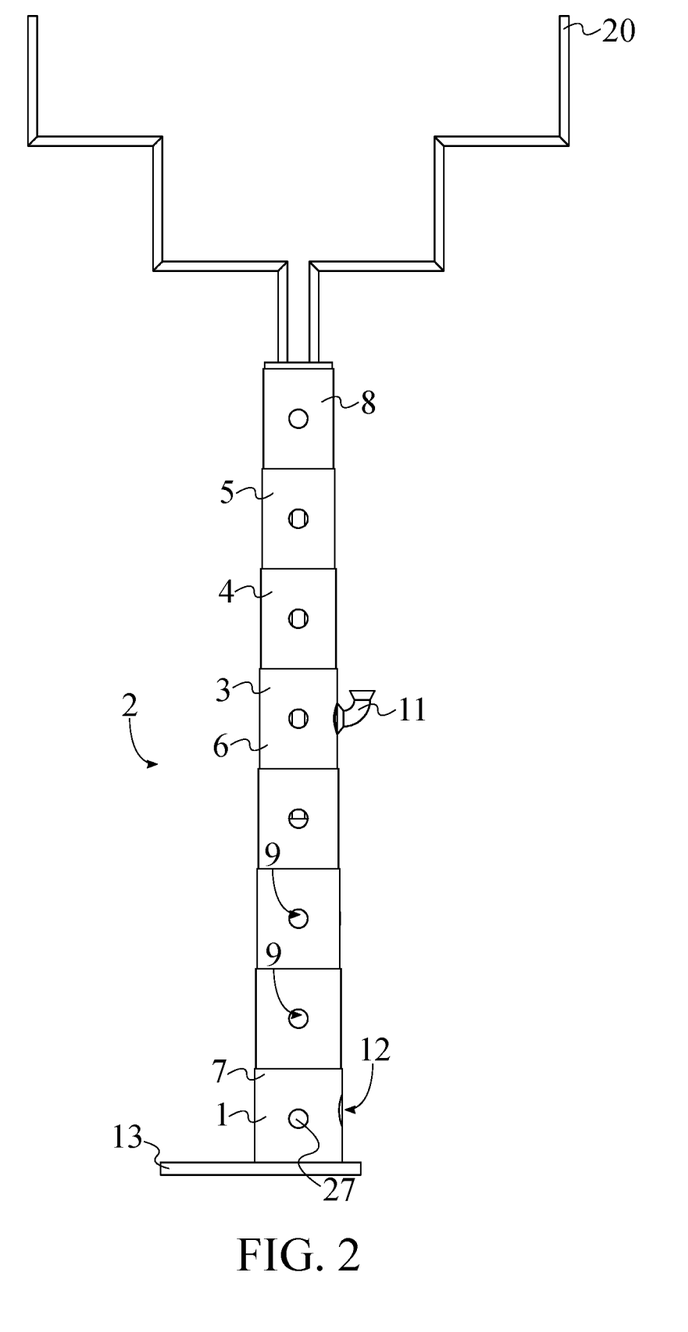
FIG. 2 is a front view of the present invention.
Figure 3:
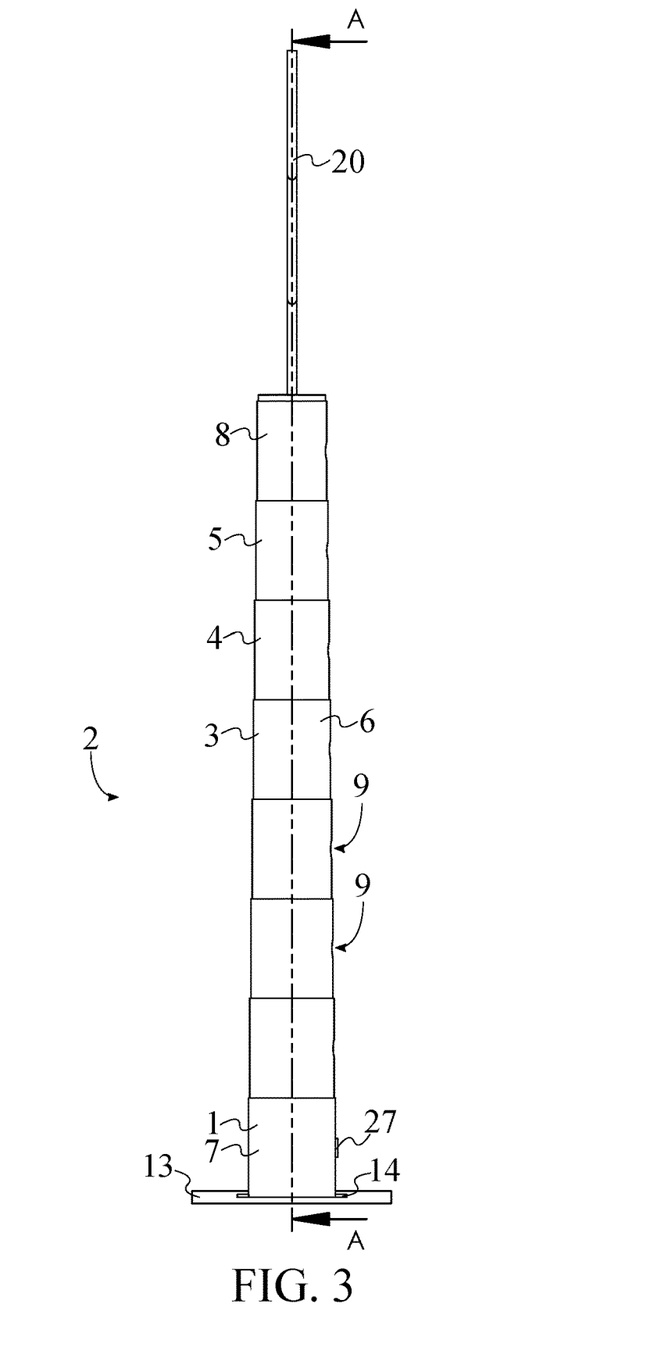
FIG. 3 is a side view of the present invention.

The present invention further comprises at least one flexible trellis member 20. The at least one flexible trellis member 20 is utilized to support and guide the growth of plants such as shrubs, grapevine, ivy, and climbing roses. The at least one flexible trellis member 20 is removably mounted into a peak member 8 from the plurality of primary extendable tubular members 2, opposite to the primary stabilizing tubular member 1. The at least one flexible trellis member 20 is thus able to extend above the plurality of primary extendable tubular members 2 and provide support and guidance for growing plants.

While the present invention may be manually extended and retracted as needed, the present invention may also be automated. As shown in the embodiment of the present invention in FIG. 4, the present invention further comprises a pneumatic telescopic cylinder 21 that enables automatic adjustment of the present invention. A first end 22 of the pneumatic telescopic cylinder 21 is internally mounted to the primary stabilizing tubular member 1. The first end 22 is thus fixed in place within the primary stabilizing tubular member 1. A second end 23 of the pneumatic telescopic cylinder 21 is internally connected to a peak member 8 from the plurality of extendable tubular members, opposite to the primary stabilizing tubular member 1. The second end 23 may thus be extended upward, pressing the peak member 8 upward and extending the height of the present invention. The pneumatic telescopic cylinder 21 is concentrically positioned within the primary stabilizing tubular member 1 and the plurality of primary extendable tubular members 2, ensuring that the present invention may be extended and retracted without physical interference from the pneumatic telescopic cylinder 21.

Figure 11:
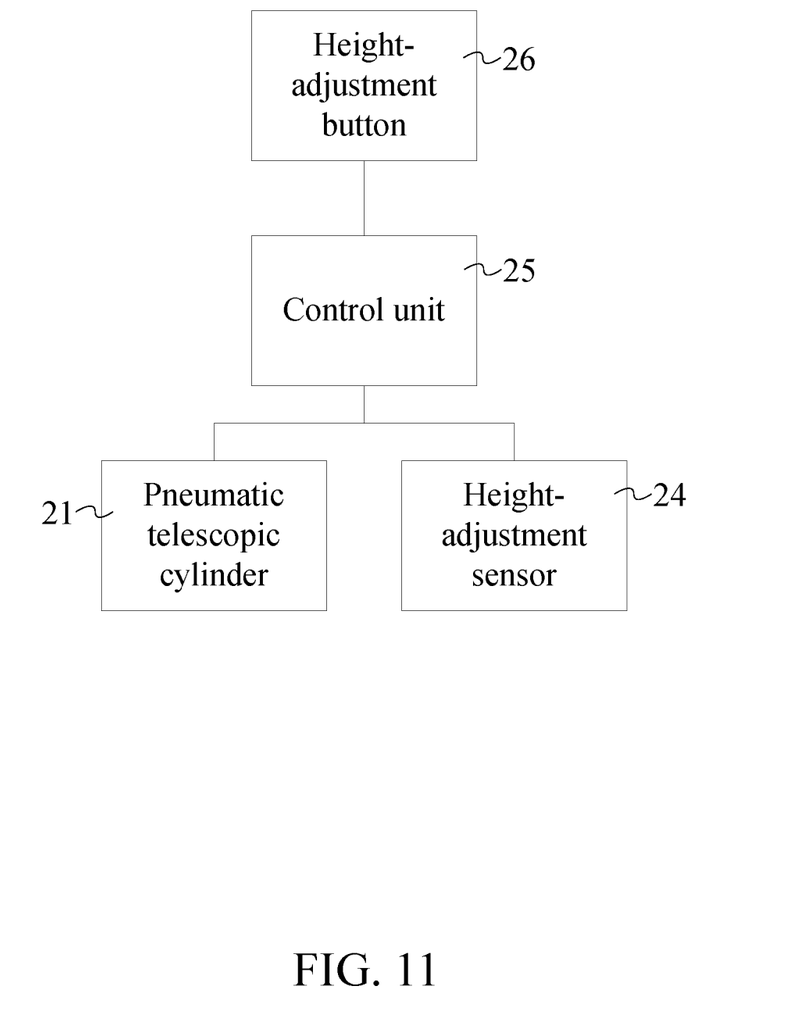
FIG. 11 is a diagrammatic view detailing electronic connections of the present invention.

The present invention further comprises a height-adjustment sensor 24 and a control unit 25 for regulating the automatic adjustment of the present invention. The height-adjustment sensor 24 automatically detects the height of the plurality of primary extendable tubular members 2. As shown in FIG. 11, the control unit 25 is electronically connected to the pneumatic telescopic cylinder 21 and the height-adjustment sensor 24, enabling the control unit 25 to regulate the pneumatic telescopic cylinder 21 when automatically adjusting the height of the present invention. The present invention further comprises a height-adjustment button 26 that serves as a physical user input to regulate the automatic height adjustment of the present invention. The height-adjustment button 26 is externally positioned to one of the plurality of extendable tubular members for convenient access by the user. The height-adjustment button 26 is electronically connected to the control unit 25 and the control unit 25 is thus able to process commands inputted through the height-adjustment button 26.

Figure 12:
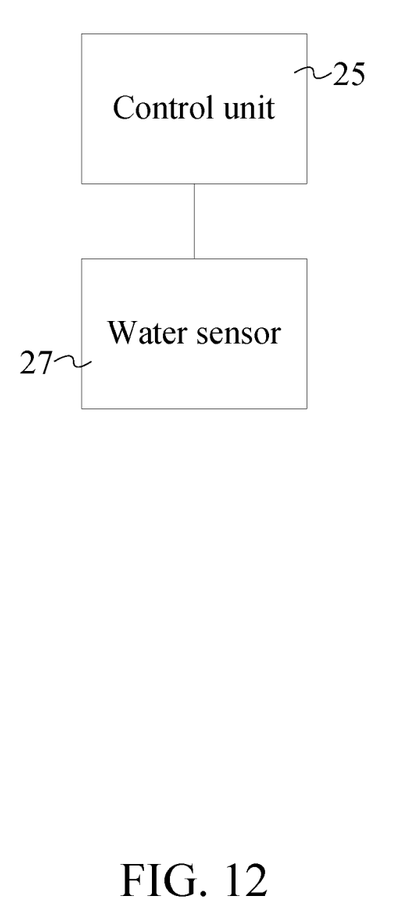
FIG. 12 is a diagrammatic view detailing additional electronic connections of the present invention.

As shown in FIG. 12, the present invention further comprises a water sensor 27 that is able to detect the presence of water near a plant's roots. The water sensor 27 is mounted to the primary stabilizing tubular member 1 and is thus positioned adjacent to a plant's roots. The control unit 25 is electronically connected to the water sensor 27, enabling the control unit 25 to receive and process readings from the water sensor 27.

Figure 6:
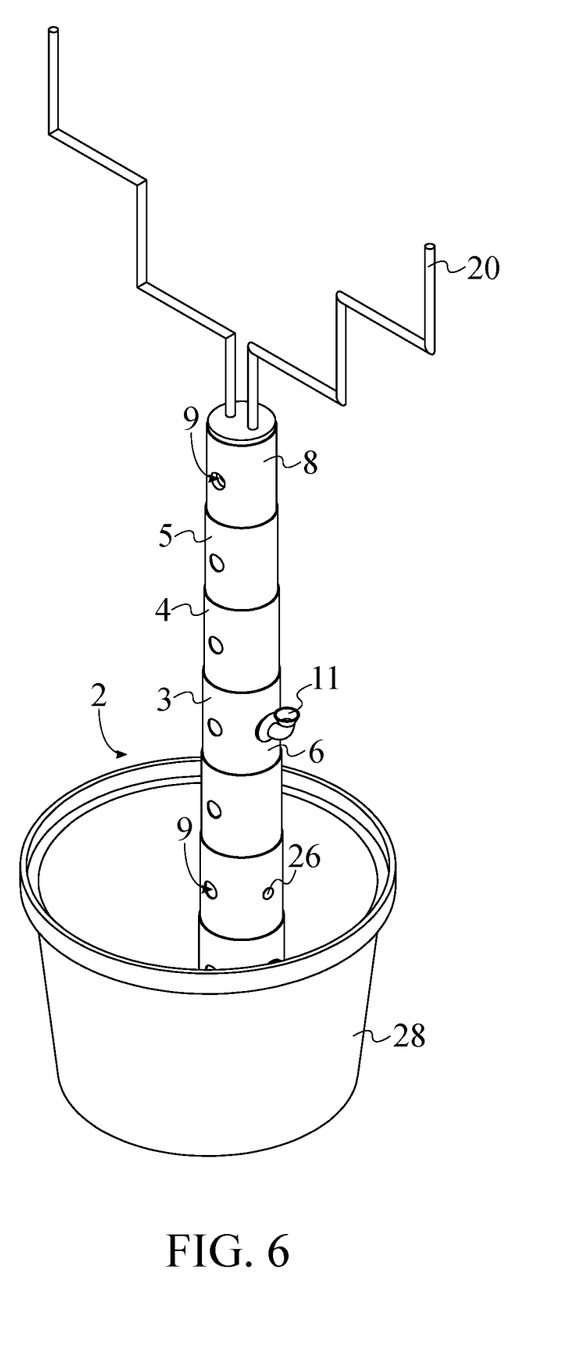
FIG. 6 is a perspective view of an alternative embodiment of the present invention with a planter pot.
Figure 7:
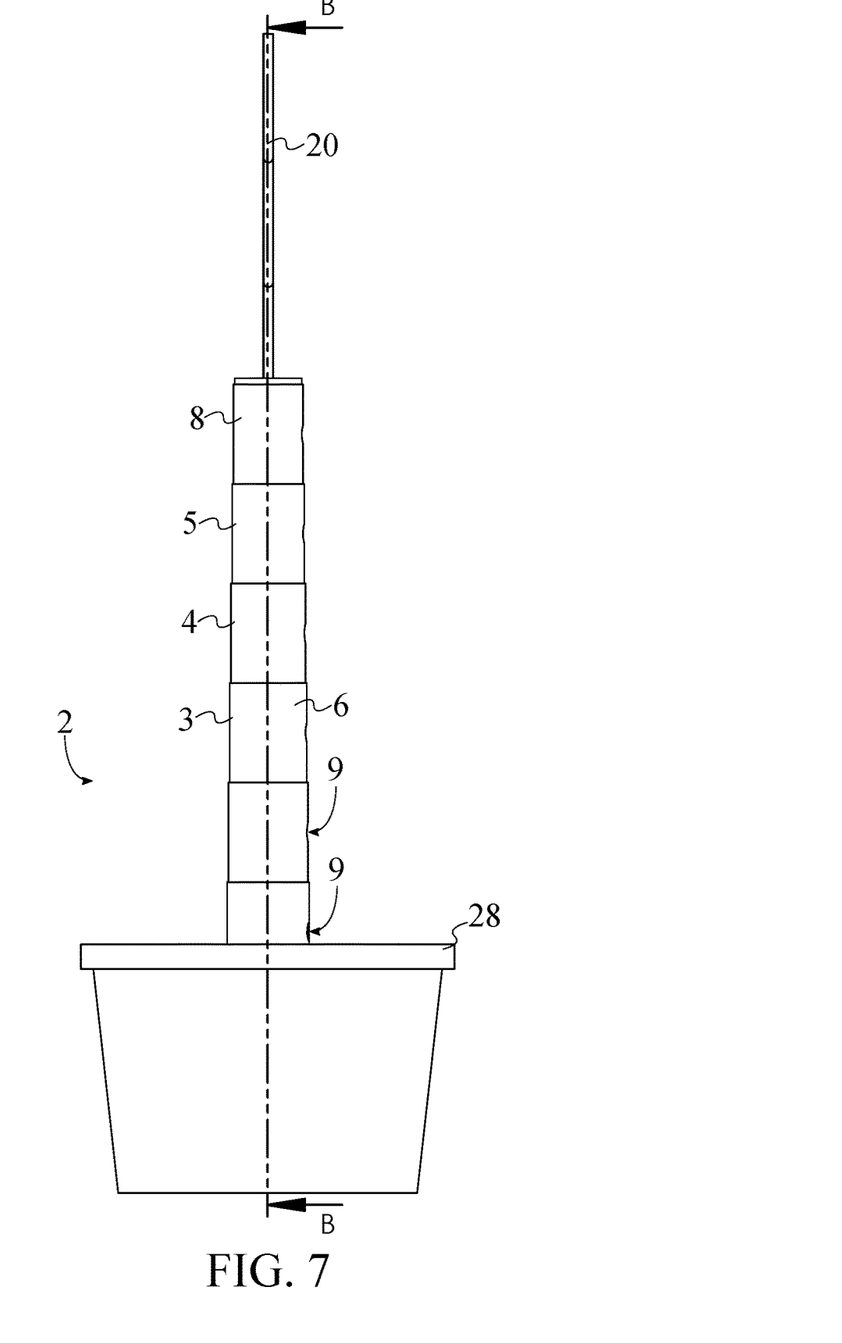
FIG. 7 is a side view of the alternative embodiment of the present invention from FIG. 6.
Figure 8:
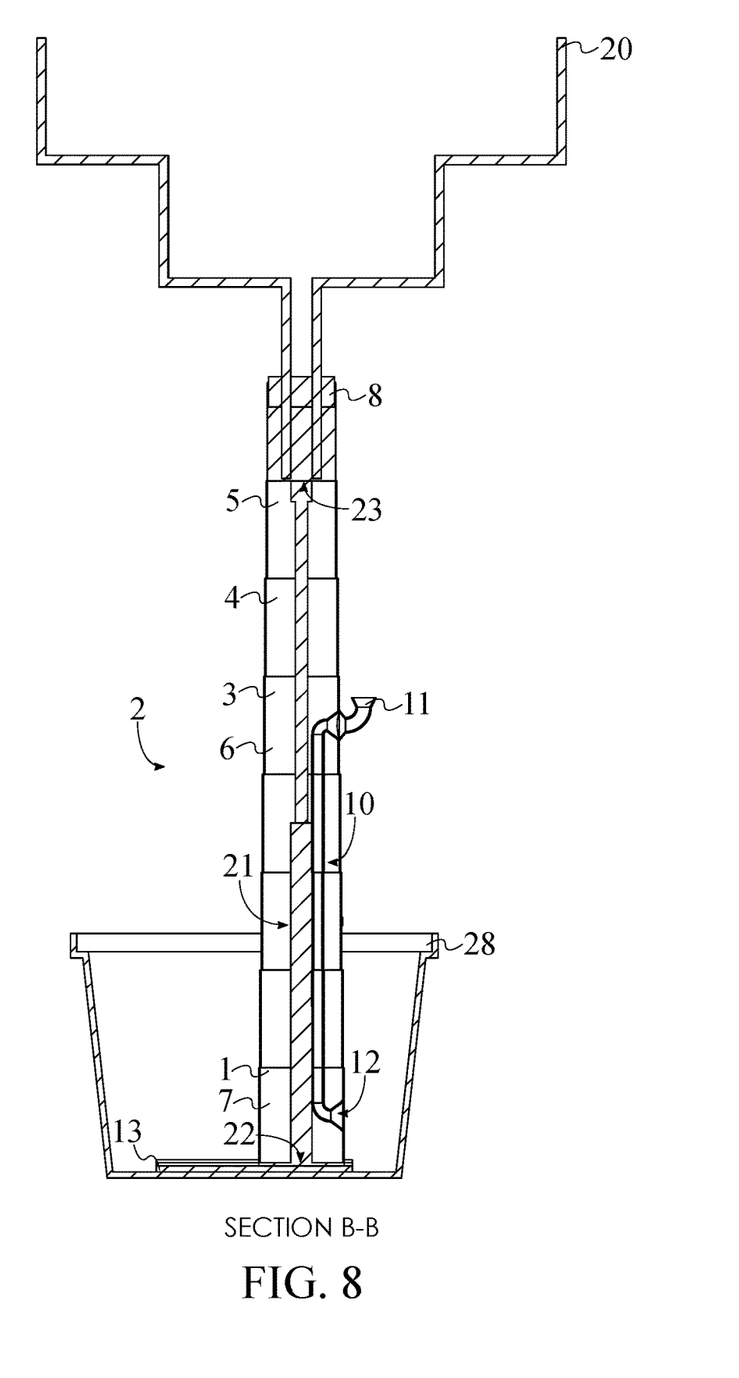
FIG. 8 is a cross-sectional view of the present invention taken along line B-B of FIG. 7.
Figure 9:
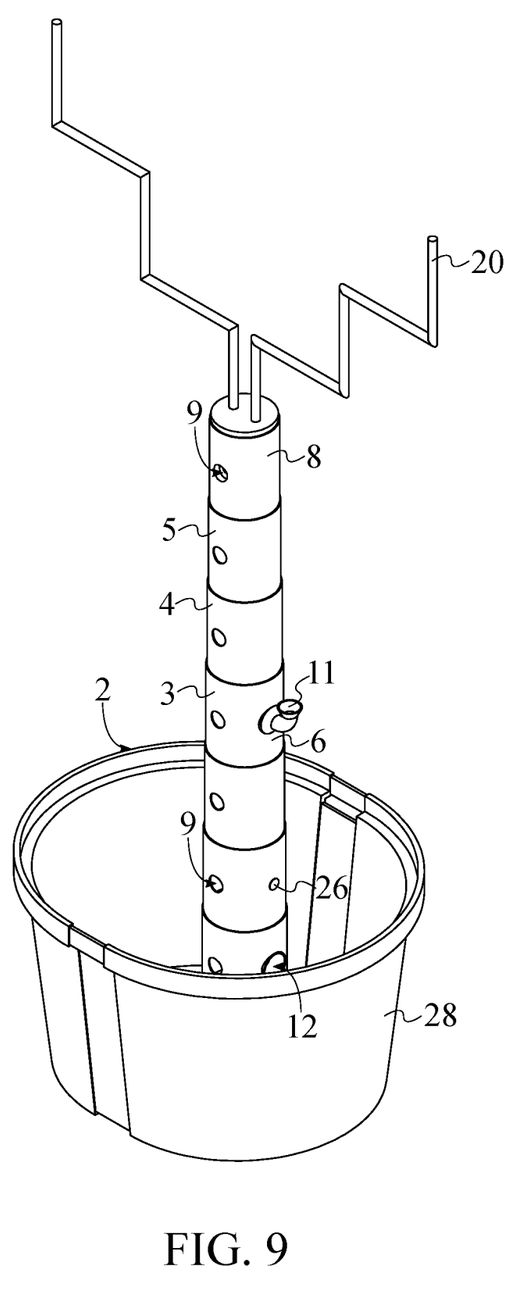
FIG. 9 is a perspective view of an alternative embodiment of the present invention with an adjustable planter pot.

The embodiment of the present invention shown in FIGS. 6-8 further comprises a planter pot 28. The planter pot 28 is integrated with the present invention and eliminates the need for an independent flowerpot for holding a plant. The base platform 13 is seated into the planter pot 28 as shown in FIG. 8, enabling the planter pot 28 to be filled with soil for a plant. The plant is then able to grow within the planter pot 28 and be supported by the plurality of primary extendable tubular members 2. The embodiment of the present invention shown in FIG. 9 includes a planter pot 28 that may be adjusted in size.

Figure 10:
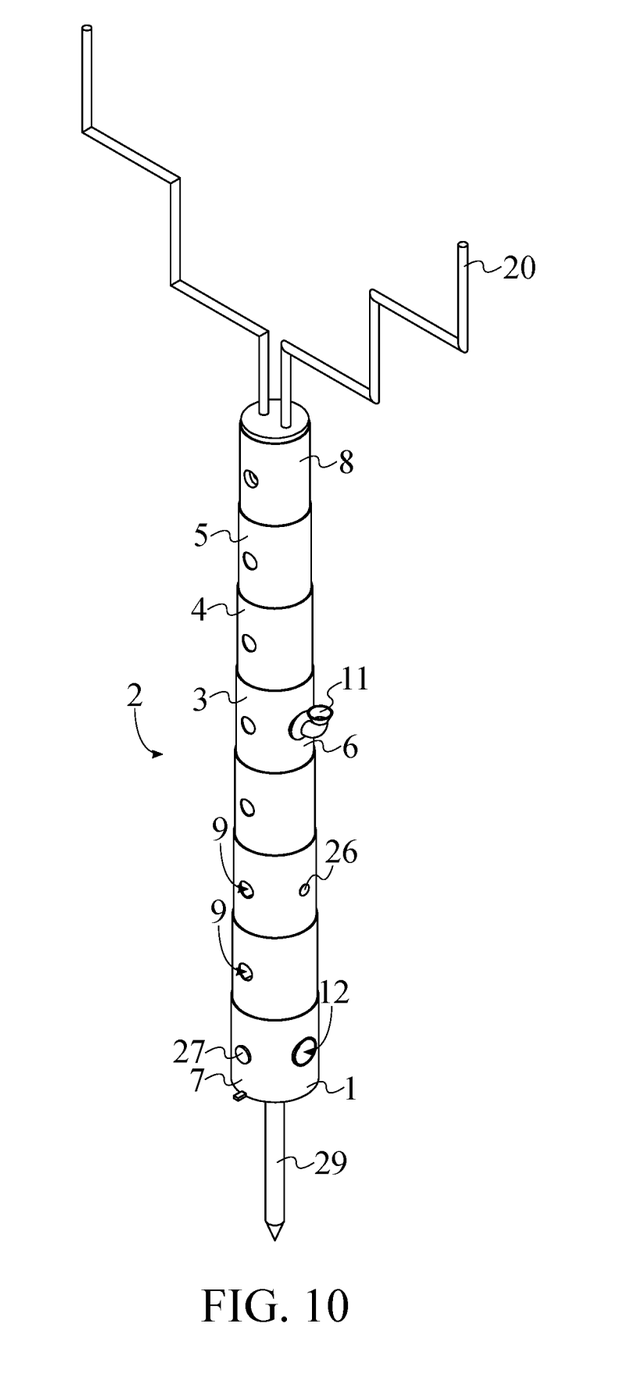
FIG. 10 is a perspective view of an alternative embodiment of the present invention with an elongated stake.

The embodiment of the present invention shown in FIG. 10 further comprises an elongated stake 29. The elongated stake 29 enables the present invention to be placed directly into soil. The elongated stake 29 is normally connected to the primary stabilizing tubular member 1, opposite to the plurality of primary extendable tubular members 2. As a result, the present invention may be placed directly into soil while the primary stabilizing tubular member 1 and the plurality of primary extendable tubular members 2 remain upright.

Although the present invention has been explained in relation to its preferred embodiment, it is understood that many other possible modifications and variations can be made without departing from the spirit and scope of the present invention as hereinafter claimed.

What is claimed is:

1. A height-adjustable plant support structure comprises:
a primary stabilizing tubular member;
a plurality of primary extendable tubular members;
a plurality of accessory-mounting holes;
a flexible water-distribution conduit;
the plurality of primary extendable tubular members comprises a selected primary tubular member, a preceding primary tubular member, and a subsequent primary tubular member;
the selected primary tubular member being telescopically engaged with the subsequent primary tubular member;
the preceding primary tubular member being telescopically engaged with the selected primary tubular member;
the plurality of extendable tubular members being telescopically engaged into the primary stabilizing tubular member;
each of the plurality of accessory-mounting holes laterally traversing into a corresponding member from the plurality of primary extendable tubular members;
the flexible water-distribution conduit being internally connected to the plurality of primary extendable tubular members;
a base platform;
an adjustment track;
the adjustment track traversing across the base platform;
the primary stabilizing tubular member being oriented normal to the base platform; and
the primary stabilizing tubular member being slidably engaged into the adjustment track.

2. The height-adjustable plant support structure as claimed in claim 1 further comprises:
an inlet of the flexible water-distribution conduit being laterally and internally connected to an inlet member from the plurality of primary extendable tubular members;
the inlet laterally traversing through the inlet member;
an outlet of the flexible water-distribution conduit being laterally and internally connected to an outlet member; and
the outlet laterally traversing through the outlet member.

3. The height-adjustable plant support structure as claimed in claim 1 further comprises:
a plurality of secondary extendable tubular members;
a secondary stabilizing tubular member;
a base platform;
the plurality of secondary extendable tubular members comprises a selected secondary tubular member, a preceding secondary tubular member, and a subsequent secondary tubular member;
the secondary stabilizing tubular member being mounted onto the base platform, adjacent to the primary stabilizing tubular member;
the plurality of secondary extendable tubular members being telescopically engaged into the secondary stabilizing tubular member, adjacent to the plurality of primary extendable tubular members;
the selected secondary tubular member being telescopically engaged with the subsequent secondary tubular member; and
the preceding secondary tubular member being telescopically engaged with the selected secondary tubular member.

4. The height-adjustable plant support structure as claimed in claim 1 further comprises:
at least one flexible trellis member; and
the at least one flexible trellis member being removably mounted into a peak member from the plurality of primary extendable tubular members, opposite to the primary stabilizing tubular member.

5. The height-adjustable plant support structure as claimed in claim 1 further comprises:
a pneumatic telescopic cylinder;
a first end of the pneumatic telescopic cylinder being internally mounted to the primary stabilizing tubular member;
the pneumatic telescopic cylinder being concentrically positioned within the primary stabilizing tubular member and the plurality of primary extendable tubular members; and
a second end of the pneumatic telescopic cylinder being internally connected to a peak member from the plurality of extendable tubular members, opposite to the primary stabilizing tubular member.

6. The height-adjustable plant support structure as claimed in claim 5 further comprises:
a height-adjustment sensor;
a control unit; and
the control unit being electronically connected to the pneumatic telescopic cylinder and the height-adjustment sensor.

7. The height-adjustable plant support structure as claimed in claim 6 further comprises:
a height-adjustment button;
the height-adjustment button being externally positioned to one of the plurality of extendable tubular members; and
the height-adjustment button being electronically connected to the control unit.

8. The height-adjustable plant support structure as claimed in claim 1 further comprises:
a water sensor;
a control unit;
the water sensor being mounted to the primary stabilizing tubular member; and
the control unit being electronically connected to the water sensor.

9. The height-adjustable plant support structure as claimed in claim 1 further comprises:
a planter pot;
the base platform;
the adjustment track;
the base platform being seated into the planter pot;
the adjustment track traversing across the base platform;
the primary stabilizing tubular member being oriented normal to the base platform; and
the primary stabilizing tubular member being slidably engaged into the adjustment track.

10. The height-adjustable plant support structure as claimed in claim 1 further comprises:
an elongated stake;

the elongated stake being normally connected to the primary stabilizing tubular member, opposite to the plurality of primary extendable tubular members.

\* \* \* \* \*